(12) United States Patent
Schmitt et al.

(10) Patent No.: US 8,696,829 B2
(45) Date of Patent: Apr. 15, 2014

(54) BRAZING PRODUCT COMPRISING A MIXTURE OF BRAZING FLUX AND FILLER METAL, AND PRODUCTION METHOD THEREOF

(75) Inventors: Philippe Schmitt, Geneuilles (FR); Boris Bosi, Fuveau (FR)

(73) Assignee: FP Soudage, Aubagne (FR)

( * ) Notice: Subject to any disclaimer, the term of this patent is extended or adjusted under 35 U.S.C. 154(b) by 525 days.

(21) Appl. No.: 12/864,978

(22) PCT Filed: Nov. 16, 2009

(86) PCT No.: PCT/FR2009/052190
§ 371 (c)(1),
(2), (4) Date: Jul. 28, 2010

(87) PCT Pub. No.: WO2010/058116
PCT Pub. Date: May 27, 2010

(65) Prior Publication Data
US 2010/0330386 A1    Dec. 30, 2010

(30) Foreign Application Priority Data

Nov. 19, 2008   (FR) .................................. 08 57863

(51) Int. Cl.
*B23K 35/22* (2006.01)
*B23K 35/40* (2006.01)
*B22F 3/12* (2006.01)
*B22F 3/20* (2006.01)

(52) U.S. Cl.
USPC ............... 148/24; 428/546; 419/32; 228/56.3

(58) Field of Classification Search
USPC ........ 75/230, 245; 419/10, 32, 35, 48; 148/24
See application file for complete search history.

(56) References Cited

U.S. PATENT DOCUMENTS

| 4,645,545 | A | * | 2/1987 | Middlestadt | ................... 148/24 |
| 5,504,296 | A |  | 4/1996 | Sato et al. | |
| 6,164,517 | A | * | 12/2000 | Kim | ............................ 228/56.3 |
| 2008/0135134 | A1 | * | 6/2008 | Kim | ............................... 148/24 |

FOREIGN PATENT DOCUMENTS

| FR | 2855085 | 11/2004 |
| WO | 0105552 | 1/2001 |

* cited by examiner

*Primary Examiner* — George Wyszomierski
*Assistant Examiner* — Ngoclan T Mai
(74) *Attorney, Agent, or Firm* — Ladas & Parry LLP

(57) ABSTRACT

A brazing product includes a compacted solid and rigid material formed of a brazing flux and a filler metal as a mixture, which has mechanical strength sufficient to make it extrudable under a press with a flux mass proportion from 3 to 20%. The invention also provides a method for manufacturing a brazing product by mixing particles of filler metal and brazing powder in order to form metal particles coated with the flux, and compacting filler metal particles coated with the brazing flux.

29 Claims, 2 Drawing Sheets

Figure 1:
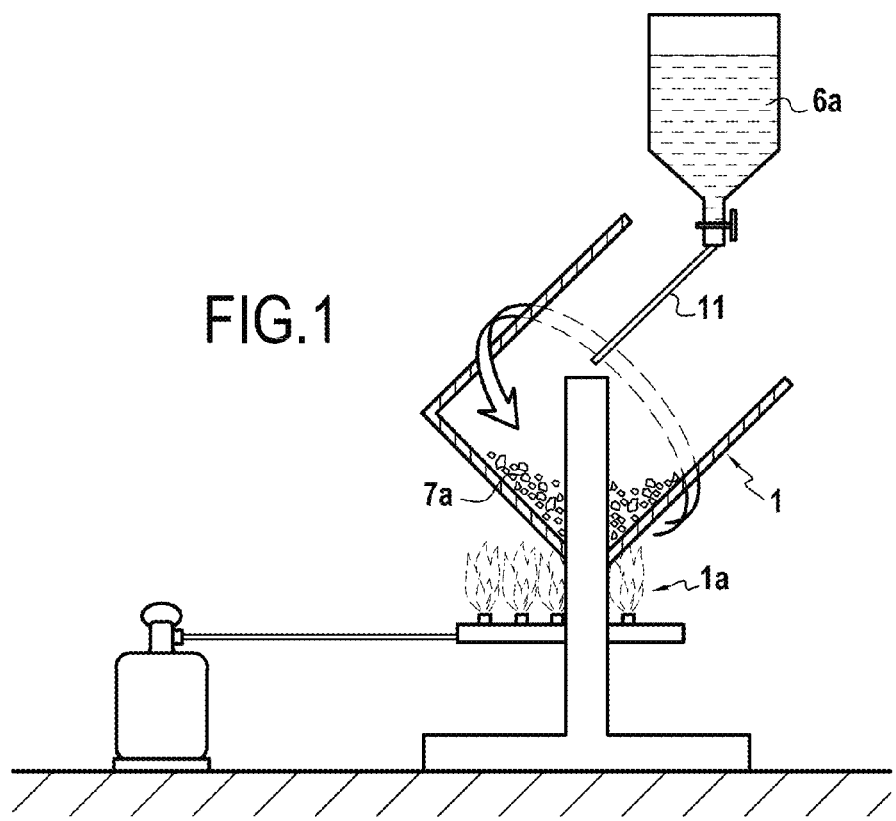

BRAZING PRODUCT COMPRISING A MIXTURE OF BRAZING FLUX AND FILLER METAL, AND PRODUCTION METHOD THEREOF

The present invention relates to a novel brazing product and to a novel method for manufacturing said brazing product comprising the mixture of at least one filler metal and brazing flux.

Brazing is the assembling of two materials by means of a metal generally in the form of an alloy called a filler metal having a melting temperature below that of the metals to be assembled and wetting by capillarity the surfaces to be assembled which do not participate by their melting in forming the brazed joint. This is a so-called heterogeneous assembly.

Heating of the brazing area may be accomplished with a soldering iron, hot air, a flame (with a blowtorch), an electric arc, an inductor or a laser. Brazing may also be accomplished in an air oven, either under a controlled atmosphere or in vacuo.

Very frequently, a material intended to promote penetration of the molten filler metal material called a brazing flux is used in combination with the filler metal. The brazing flux under the effect of heating (flame, induction . . . ) will first strip the parts to be assembled, then allowing wetting of the filler metal. Wetting is the capability of the metal of <<flowing>> along the parts to be assembled. The molten flux then protects the brazed joint during its cooling.

The brazing flux is therefore a mixture of chemical products with which proper wetting of the filler alloy may be ensured on the parts to be assembled by:

removing the oxides present at the surface of the parts to be assembled, and protecting the parts to be assembled from oxidation during the whole duration of the brazing operation, and by lowering the surface tension of the filler alloy.

This is a reducing agent designed for assisting with removal of the impurities and allowing wetting of the filler metal by destroying the oxide layer at the surface of the metals to be assembled.

For each type of filler metal, a suitable brazing flux type and relative brazing flux amount are selected, it being understood that the brazing flux should i.a. be selected so as to have a melting temperature lower by a few degrees than that of the filler metal. Thus, when the assembly of the parts to be brazed and of the filler metal/brazing flux pair is heated, the brazing flux first melts in order to fulfil its technical function before the melting of the filler metal.

As an example, the following brazing fluxes may be used:

for a filler metal mainly consisting of copper or silver, a flux based on a mixture of boric acid and of potassium fluoride;

for a filler metal in majority consisting of aluminium, a flux based on potassium cryolite; and for a filler metal in majority consisting of zinc, a flux based on cesium cryolite.

The filler metal is generally mixed with or formulated with brazing flux.

The brazing flux and the filler metal often appear to the user as two distinct constituents, as a flux powder or paste on the one hand, and as a hollow wire or strip or rod of filler metal on the other hand, including a core in one of the constituents which is coated with the other constituent.

In particular a brazing product is known in which the filler metal appears as a strip or thin sheet folded on itself and containing the brazing flux. But the seal is not a good seal and upon forming the thin sheet, notably as rings or rods, the latter may open causing a loss of flux. On the other hand, the brazing flux/metal mass ratio is not perfectly homogenous over the section of the obtained stuffed wire or rod.

A brazing product as a metal tube of the filler metal, obtained by extrusion, filled with brazing flux powder is also known. This type of brazing product is more impervious and allows a controlled and homogeneous brazing flux/metal mass percentage ratio to be obtained by which it is possible to deposit exactly the required amount of brazing flux and metal. Finally, this presentation as a tube filled with flux allows presentation of the wire in different forms, notably as rings for facilitating brazing of parts with circular section. These wires generally have an outer diameter from 0.8 to 5 mm and an inner diameter of the central hole from 0.3 to 2 mm. These wires may appear in unit lengths up to 2 m or wound as 10-15 kg coils or as rings with dimensions (wire diameter and ring diameter) allowing deposition of the desired amount of metal.

The relative amount of brazing flux inter alia depends on the nature of the materials to be assembled and on their oxidizability. For a filler alloy of the aluminium (Al) type, the flux mass proportion is of the order of 10-20%. For a filler alloy of the zinc, copper-zinc-silver type, the flux mass proportion is of the order of 3-12%. The relative amount of brazing flux also depends on the shape of the brazing product, i.e. thin sheet, stuffed tube, or coated rod.

In practice, in a stuffed tubular wire filled with brazing flux, the sufficient brazing flux mass proportion is generally from 5-20% of the total weight of the wire+flux.

However the method for manufacturing these stuffed tubular wires is long and expensive. Further, it is not possible to apply it for certain brazing fluxes. Indeed, the filler metal tube may be filled with brazing flux by a known filling method by vibration in which the brazing powder initially with a grain size of 1-10 µm is granulated as 50-100 µm grains in order to avoid bulk aggregation of the flux powder and its clogging of the tube preventing its proper filling. To do this, tubes with a larger outer diameter and larger inner diameter have to be made in order to successfully fill them with flux by vibration, before drawing the tubes as hollow wires with a smaller outer diameter and smaller inner diameter.

On the other hand, for certain fluxes, like fluxes based on potassium cryolite, the flux grains disintegrate when subject to vibration upon filling the tube.

Further, the brazing products above consisting of filler metal wire or rod filled with brazing flux have some heterogeneity due to the juxtaposition of 2 constituents which may result in brazing defects. A lack of flux generates poor castability of the metal and holes in the brazed joint. Excess flux requires more significant cleaning of the brazed joint.

In order to find a remedy to the above heterogeneity, there exist abraded pastes formed with a ready-to-use prepared mixture of filler metal powder and of flux in desired proportions, the grains of which are bound to each other by means of a binder. However, the presence of the binder in the abraded paste requires increased supply of heat i.e. it is necessary to spend more energy and more time. Further, the paste requires an application tool such as a syringe or pipette.

In order to remedy these drawbacks and shortcomings, in FR 2 855 085, the applicant described a novel brazing product type formed from a block of brazing material obtained by directly mixing brazing flux powder of 1-10 µm grain size and filler metal powder of 50-350 µm grain size, the mixture then being compacted at a pressure from 1,000 to 1,500 bars at a temperature above 300° C., but lower than the melting temperature of the brazing flux. A relatively homogeneous block is obtained which may then be mechanically transformed so as to be shaped by any known technique, as a wire, band or rod i.a.

This method from FR 2 855 085 is however not totally satisfactory, since it is observed that for lack of applying a significant amount of flux, notably a flux proportion of more than 25% by weight relatively to the total weight of the mixture, the filler metal is not sufficiently protected from oxidation by the brazing flux. This oxidation appears as an oxide surface layer (notably of alumina for aluminium-based alloys) which proportionately requires an increase in the brazing flux. But, such a flux mass proportion of more than 25% reduces the mechanical strength of the mixture material, which then becomes incompatible with a mechanical transformation of the brazing product in the form of a wire with small diameter and great length whether this is in unit length or as a coil.

In WO 01/05552, a brazing product consisting of directly compacted filler metal powder and brazing flux and dry molded as rings is described. The size of the metal particles is not indicated.

In EP-588 545, brazing products obtained by compacting filler metal powder and brazing flux are also described. But it is specified that in order to obtain a uniform mixture and a sufficiently dense internal structure, the size of the particles should not exceed 44 µm for metal particles and 30 µm for the grains of the brazing flux. In EP-588 545, only a brazing product in the form of flat strips obtained by molding is described.

The brazing products obtained by the method described in documents EP-588 545 and WO 01/05552 do not give the possibility of obtaining brazing products which have both sufficient mechanical strength properties in order to be able to be transformed into wires of small diameter of great length by pressing on the one hand, and oxidation resistance properties on the other hand.

The object of the present invention is to provide a novel type of brazing product consisting of a mixture of filler metal and of brazing flux, but which is sufficiently mechanically resistant on the one hand so as to be transformable into a wire of small diameter and great length and for which the filler metal does not oxidize on the other hand.

To do this, the present invention provides a method for manufacturing a brazing product from a brazing flux powder and a filler metal characterized in that the following steps are carried out, wherein:
  a) filler metal particles preferably from a filler alloy with a size from 500 µm to 5 mm, preferably from 2 to 4 mm are prepared, and
  b) said brazing flux powder with a grain size of less than 100 µm is mixed with water until a low viscosity paste is obtained capable of flowing plastically, preferably a liquid paste, and
  c) said brazing flux paste is preferably poured gradually and with a low flow rate, still preferably dropwise on said metal particles, while kneading and heating said metal particles to a temperature of at least 100° C., preferably from 120 to 150° C., until a regular coating of the surface of each of said filler metal particles is obtained with said paste, and said coated particles are heated to said temperature until the water contained in said brazing flux coating said particles is evaporated, and
  d) said brazing product is obtained by mechanically compacting the particles coated in step c), at a pressure of at least 5,000 bars, preferably 7,000 bars, while heating them to a temperature lower by least 300° C. than the melting temperature of the brazing flux.

The brazing product therefore exclusively consists of metal and of flux.

The method for preparing metal particles coated with brazing flux according to steps a) to c) corresponds to the method for making confectionary almond dragees. A homogeneous coating in composition and thickness with a rigid flux layer may thereby be obtained over the whole surface of said particles.

In step c), by heating the coated particles it is possible to evaporate the water contained in said brazing flux paste coating said particles.

The pressure applied in step d) allows evacuation of the air contained in the mixture and removal of the porosities in the obtained brazing product.

Such a compression operation may be called a <<hot isostatic compaction method>> (HIC) by simultaneous action of pressure and of temperature.

By the temperature applied in step d), it is also possible to obtain evaporation of the residual water or atmospheric water which is adsorbed on or absorbed in the flux after step c), but the applied temperature below the melting temperature of the flux gives the possibility of avoiding deterioration of the characteristics of the brazing flux and avoiding any segregation relatively to the filler metal.

A block is obtained in which it is observed by cutting sections in the bulk that the spaces between the metal particles are entirely filled with said flux, the latter surrounding metal particles on the whole of their perimeter. It is seen that the filler metal does not oxidize during its making and subsequently in the finished product since the product properly brazes without any addition of complementary flux.

On the other hand, in a product obtained according to the method of FR 2 8550585, the filler metal, because of its small grain size, has a surface exposed to very significant oxidation relatively to the total weight and requires a larger amount of brazing flux of more than 30% by total weight.

At the end of step d), the obtained compacted material block may be mechanically shaped as a wire, a rod, a bar, a strip or sheets or rings by mechanical transformation operations selected from drawing, extrusion, wire drawing, spooling, facing, ring-forming, rolling, calendering, hot extrusion and cutting operations.

In particular, the obtained compacted material has sufficient mechanical strength so as to be mechanically transformed into a wire, notably in an extruding press. Extrusion is a method for shaping metals by forging consisting of pushing a material into a container. The material is made ductile by heating to a so-called extrusion temperature, and is pushed through a hole or die at the end of a container. The thrust allowing deformation is provided by a press or piston actuated by preferably hydraulic actuators inside the container. From a certain pressure, there is plastic flow through the die. A wire with a circular section or profiles with sections of different shapes corresponding to that of the die may be obtained.

In step a), by particle size from 500 µm to 5 mm is meant the largest dimension of said particles.

Preferably, said starting particles have a substantially homogeneous shape, i.e. with at least substantially the same length in two substantially perpendicular directions.

Said filler metal particles may be prepared by cutting them out in a mass of said metal with a larger volume.

More particularly, the grain size of the brazing flux is from 10 to 40 µm.

According to other particular features of the invention:
- in step a), said filler metal particles are prepared by cutting them in a solid wire of said filler metal with a diameter corresponding to said size from 500 µm to 5 mm, per unit length preferably substantially equal to the diameter of the wire;
- in step b), the water mass proportion is preferably from 30 to 50%, preferably 40% for 50 to 70% of flux powder, preferably 60%,
- in step d) the heating temperature is comprised between 300° C. and 500° C.

Preferably, in step c), the so-called flux paste is poured into a mixer consisting of a rotating rotary tank containing said particles, said tank being heated to said temperature.

In step c), the so-called brazing flux paste is poured in such an amount that a mixture is obtained with the sought weight proportion of brazing flux relatively to the total weight of flux and metal in the brazing product. More particularly, the mass proportion of flux is from 3 to 20% relatively to the weight of said coated metal particles.

Still more particularly, the filler metal is an alloy comprising as a base metal, a metal selected from silver, aluminium, zinc and copper, the secondary metal of the alloy being selected from Si, Zn, Cu, Mn, Fe, Cr, Zr, Sn, Ti, Be, Cd, Ag, Al, and Sb.

According to an exemplary embodiment, the filler alloy is a mixture of 88% by weight of aluminium, 12% by weight of silicon, the brazing flux is potassium cryolite comprising 27 to 30% of potassium, 1.5 to 2% of cesium, 16 to 18% of aluminium and 49 to 53% of fluorine, and the mass proportion of brazing flux is from 8 to 12%.

This alloy and this brazing flux have melting temperatures of 580° C. and 566° C. respectively.

According to another exemplary embodiment, whether the alloy comprises 75 to 98% of Zn and 2 to 25% of Al respectively, the flux is cesium cryolite comprising 50 to 65% of cesium, 5 to 15% of aluminium and 25 to 40% of fluorine, and the mass proportion of flux is from 5 to 15%.

This alloy and this flux have melting temperatures from 420 to 460° C. and 440 to 450° C. respectively.

According to another exemplary embodiment, the alloy comprises 30 to 56% of Ag and 3 secondary metals comprising Cu, Zn and Cd or Cu, Zn and Sn, and the flux is a mixture of boric acid and potassium fluoride and the flux mass proportion is from 3 to 10%. These alloys and this flux have melting temperatures from 620 to 760° C. for the alloys and 450° C. for the flux respectively.

In a preferred embodiment, in step d) a brazing product is made, consisting of a solid wire preferably with a diameter from 1 to 3 mm, by carrying out the following steps:
- d-1) the coated particles of step c) are placed in an extruding press cylindrical container (2) which is brought to a so-called temperature corresponding to the extrusion temperature, and a first compression is carried out inside said container at a pressure of at least 5,000 bars with the piston (3) of the extruding press (4) in order to obtain a compact billet (5) with a diameter preferably of at least 50 mm, and
- d-2) a second compression is carried out with said piston at a pressure capable of allowing extrusion of the billet through a die with a smaller diameter than that of the billet, preferably with a diameter from 1 to 3 mm, at a second pressure of at least 10,000 bars, still preferably of at least 15,000 bars.

In step d-1), the first compression at a pressure of at least 5,000 bars corresponds to a pressure less than the extrusion pressure. Decompression consecutive to this first compression by withdrawal of the piston allows evacuation of air and water having been left as humidity in the material.

In step d-2) the strong thrust combined with the section ratio between the billet and the wire, the latter corresponding to that of the die, leads to elongation of the particles such that when a cross-section of the obtained wire is observed, an apparently homogeneous mixture is observed without any possibility of distinguishing particle contours in the absence of a microscope.

In a known way, the obtained wire may be straightened as a rod up to 2 m or wound or shaped as rings with an inner ring diameter from 2 to 100 mm.

This method for manufacturing a brazing wire according to the invention is particularly advantageous in terms of cost as compared with the method for making stuffed wires of the prior art, insofar that a wire with a desired diameter is directly obtained without having to resort the intermediate step for making a tube of larger diameter as described earlier concerning the prior art. The method for obtaining a solid brazing wire according to the invention is therefore much less expensive than the method for obtaining a wire of the prior art.

The present invention also provides a brazing product which may be obtained by the method as defined above, characterized in that it comprises a compacted solid and rigid material exclusively consisting of said brazing flux and of said filler metal, appearing as a block, in particular as a billet, its structure as observed in a transverse or longitudinal section of said product consisting of said filler metal particles coated with said flux, said filler metal particles having a size from 500µ to 5 mm, preferably from 2 to 4 mm, said coated particles being compacted so that said brazing flux entirely fills the spaces between said metal particles, said solid material having a mechanical strength making it capable of being extruded under a press, notably in order to obtain a wire with a section from 1 to 3 mm, with a mass proportion of said brazing flux from 3 to 20%, preferably less than 15%.

This brazing product as a block is obtained by the method as defined above after transformation into the form of a wire, notably a method obtained at the end of step d-1) above.

The obtained brazing product is particularly advantageous in that it allows perfectly controlled homogeneity of the flux/metal ratio and said material does not oxidize. Further, such a product may be obtained with any flux. Finally, its manufacturing cost is relatively low and it may be transformed into any shapes, notably profiles or wires.

The present invention also provides a brazing product, as a wire which may be obtained by the method defined above in step d-2), characterized in that it appears as a wire, preferably with a diameter from 1 to 3 mm and has a structure such that in a longitudinal section of said wire, a mixture of said filler metal with said brazing flux is observed, exclusively consisting of said filler metal with said brazing flux, with longitudinal traces of brazing flux embedded in the bulk of the filler metal, with a mass proportion of said brazing flux from 3 to 20%, preferably less than 15%.

By <<exclusively consisting of>> is meant above that the mixture essentially consists in both said constituents for producing the technical brazing effect.

This product is particularly advantageous as compared with hollow wires of filler metal stuffed with brazing flux, in that the flux emerges on the whole section of the wire and not only through the centre as for hollow wires (therefore possibly through the ends of the ring) and structural homogeneity between flux and metal is optimum.

Comparative brazing tests were carried out with brazing wires according to the invention, and stuffed brazing wires according to the prior art, which confirm upon examination under the microscope the better quality of the brazed joint in terms of aspect and of absence of any apparent deposit with the wires according to the invention. On the other hand, mechanical strength tests, i.e. tensile strength tests and sealing tests of brazed joints made with wires according to the invention meet the reference values obtained by the stuffed brazing wires of the prior art.

Figure 2:
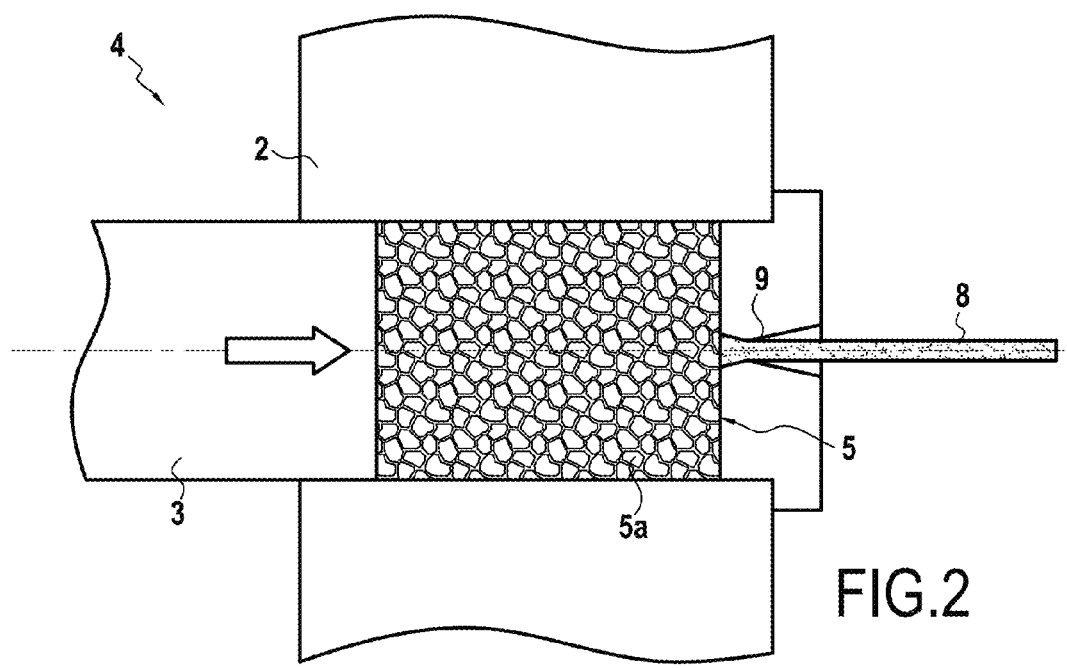
Figure 3:
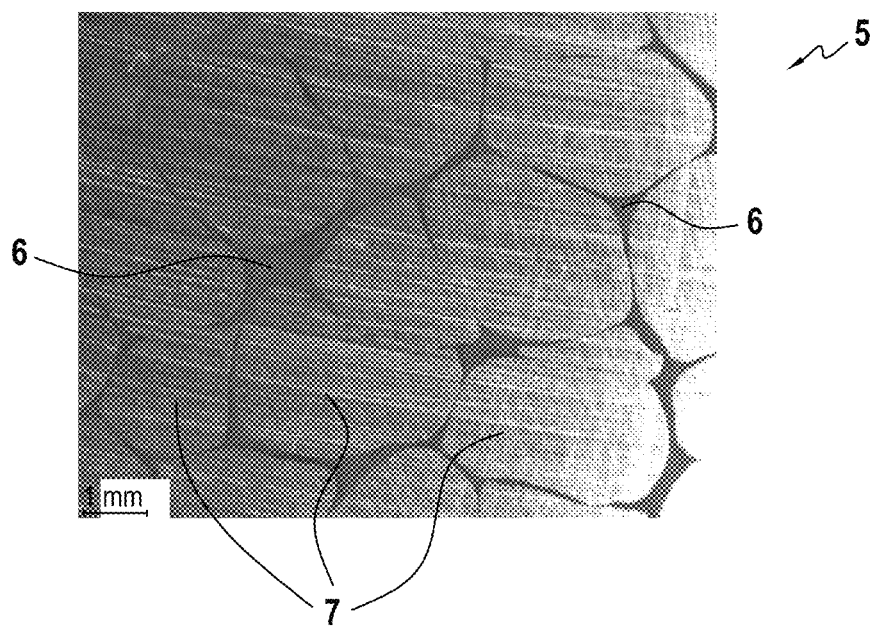
Figure 4:
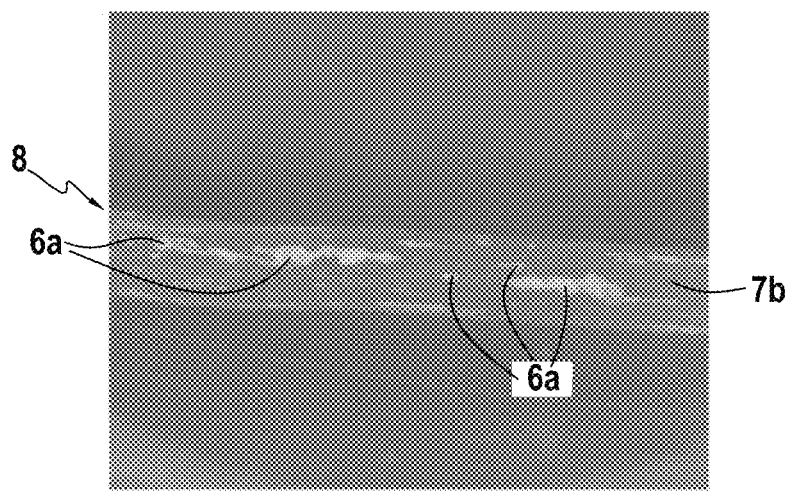

Other features and advantages of the present invention will become apparent in the light of the examples of the detailed description which follows, made with reference to the figures wherein:

FIG. 1 illustrates a rotary tank applied in steps a) to c) of the method, and, FIG. 2 illustrates an extruding device applied in steps d1) and d2) of the method described above, FIG. 3 illustrates a longitudinal section of a brazing product obtained as billets in step d1) defined above, and FIG. 4 illustrates a longitudinal section of a brazing product as a wire with a diameter of 1.6 mm, obtained in step d2) described above.

EXAMPLE 1

1. Base Materials
A uniform solid filler metal wire with a diameter of 3 mm of AlSi 12, i.e. a filler alloy which is a mixture of 88% by weight of aluminium and 12% by weight of silicon. This alloy has a melting temperature of 580° C.
Nocolock Cs® powdered brazing flux from SOLVAY (Belgium) comprising potassium cyolite comprising by weight 29% of potassium, 1.8% of cesium, 17% of aluminium and 51% of fluorine. This brazing flux has a grain size from 10 to 20 µm and a melting temperature of 566° C.
Water 2. Making Coated Particles
The solid filler metal wire is cut into pieces or particles 7a with a length equal to the diameter of 3 mm by means of a blanking press (or any installation allowing this cutting).

The flux is mixed with water in order to obtain a liquid paste 6a, in a weight ratio of 40% flux, 60% water.

The metal grains or particles are then heated 1a in a tilted rotary tank 1 to a temperature of about 120-150° C.

At this temperature, the flux paste is poured 11 substantially at the centre of the rotary tank 1 gradually dropwise on the kneaded and heated metal particles rotating in said rotary tank so as to produce a regular and homogeneous coating of the metal particles.

When all the water has evaporated, the metal particles are coated with a flux layer with a thickness from 0.4 to 0.9 mm, representing a mass proportion of brazing flux between about 10 and 15%. The mixture of coated particles is then ready for the second step hereafter.

3. Billet and Wire Manufacturing
The making of the wire is carried out with an extruding press 4 containing a cylindrical container 2 with a diameter of 58 mm. The container of the press is kept at a temperature of about 450° C. by heating. The coated grains are loaded into the container of the extruding press.

The coated grains 5a are then compressed by actuating the piston at a pressure of 7,000 bars in order to form a compact 'billet' 5.

A decompression phase by withdrawal of the piston 3 then allows evacuation of the air and water having been left in the form of humidity.

The obtained billet 5 has a longitudinal section structure at this stage as illustrated in FIG. 3. The contours of the filler metal particles 5a coated with flux are observed, said flux 6 filling the spaces between the metal particles 7.

This billet is then compressed again at 15,000 bars, still maintained at 450° C. in order to be extruded through a die 9 in the form of a wire 8 with a desired diameter (generally between 2.4 mm and 1.6 mm).

The strong section coefficient (2 mm vs. 58 mm) combined with the pressure and temperature indicated above allows greater homogenization of the structure between filler metal and brazing flux in the final product, as illustrated in FIG. 4. In a longitudinal section of the wire, longitudinal traces of brazing flux 6a embedded in the bulk of the metal 7b are observed, i.e. the metal 7b surrounding the slender traces of brazing flux 6a, without the possibility of distinguishing the contours of metal particles 7a.

In FIG. 4, the oblique striations on the wire result from the polishing of the surface before observation under the microscope.

The made wire 8 may then be wound, strengthened as a rod or shaped as rings directly at the machine outlet.

EXAMPLE 2

1. Base Materials
A uniform solid metal wire with on average a diameter of 3 mm of an alloy comprising 98% Zn and 2% Al. This alloy has a melting temperature of 440° C.
The brazing flux is cesium cryolite from Chemetall GmbH (Germany) comprising 56% cesium, 10% aluminium and 32% fluorine. This flux has a grain size from 10 to 20 µm and a melting temperature from 450 to 460° C.
Water 2. Making Coated Particles
The same procedure as in Example 1 with the same mass proportions of 60% water in the paste and 10% flux in the coated particles and kneading and coating are accomplished at the same temperature of 120° C.

3. Billet and Wire Manufacturing
The same procedure as in Example 1 is followed with a press heating temperature of 330° C. and compression pressures of 7,000 bars in order to obtain a so-called billet and with recompression pressures of 25,000 bars for obtaining a wire 8 through the die 9.

The invention claimed is:

1. A method for manufacturing a brazing product from a brazing flux powder and a filler metal, said method comprising the steps of:
   a) providing filler metal particles with a size from 500 µm to 5 mm, and
   b) mixing said brazing flux powder having a grain size of less than 100 µm with water until a low viscosity paste is obtained, capable of flowing plastically, and
   c) pouring said brazing flux paste on said metal particles while kneading and heating said metal particles to a temperature of at least 100° C. until a regular coating of the surface of each of said filler metal particles with said paste is obtained, and heating said coated particles to said temperature until the water contained in said brazing flux coating said particles is evaporated, and
   d) mechanically compacting the particles coated in step c) at a pressure of less than 5,000 bars by heating them to a temperature lower by at least 300° C. than the melting temperature of the brazing flux; and recovering said brazing product.

2. The method according to claim 1, characterized in that in step a), said filler metal particles are prepared by cutting them in a solid wire of said filler metal with a diameter corresponding to said size from 500 μm to 5 mm, per unit length.

3. The method according to claim 2, wherein said size is substantially equal to the diameter of the wire.

4. The method according to claim 1, characterized in that in step b), the water mass proportion is from 30 to 50% for 50 to 70% of flux powder.

5. The method according to claim 4, wherein the water mass proportion is 40% for 50 to 70% of flux powder.

6. The method according to claim 1, characterized in that in step c), said flux paste is poured into a mixer consisting of a rotating rotary tank containing said particles, said tank being heated to said temperature.

7. The method according to claim 4, wherein the water mass proportion is from 30 to 50% for 60% of flux powder.

8. The method according to claim 1, characterized in that in step d), the heating temperature is comprised between 300° C. and 500° C.

9. The method according to claim 1, characterized in that the flux mass proportion is from 3 to 20%, relative to the weight of said coated metal particles.

10. The method according to claim 1, characterized in that the filler metal is an alloy comprising as a base metal, a metal selected from silver, aluminium, zinc, and copper, the secondary metal of the alloy being selected from Si, Zn, Cu, Mn, Fe, Cr, Zr, Sn, Ti, Be, Cd, Ag, Al, and Sb.

11. The method according to claim 10, characterized in that the filler alloy is a mixture of 88% by weight of aluminium and 12% by weight of silicon, the brazing flux is potassium cryolite comprising 27-30% of potassium, 1.5-2% of cesium, 16-18% of aluminium and 49-53% of fluorine, and the mass proportion of brazing flux is from 8 to 12%.

12. The method according to claim 10, characterized in that the alloy comprises 75-98% of Zn and 2-25% of Al, respectively, the flux is cesium cryolite comprising 50-65% of cesium, 5-15% of aluminium and 25-40% of fluorine, and the flux mass proportion is from 5 to 15%.

13. The method according to claim 1, characterized in that in step d), a brazing product is made, consisting of a solid wire by carrying out the following steps:
   d-1) the particles coated in step c) are placed in a cylindrical container of an extruding press which is brought to a so-called temperature corresponding to the extrusion temperature and a first compression is carried out inside said container at a pressure of at least 5,000 bars with a piston of the extruding press in order to obtain a compact billet, and
   d-2) a second compression is carried out with said piston at a pressure capable of allowing extrusion of the billet through a die with a smaller diameter than that of the billet at a second pressure of at least 10,000 bars;

wherein the particles coated in step c) comprise filler metal particles having a size of 2 to 5 mm coated with said flux.

14. A brazing product obtained by the method according to claim 13, characterized in that it presents the form of a wire, and has a structure such that in a longitudinal section of said wire, a mixture of said filler metal with said brazing flux is observed, exclusively consisting of said filler metal with said brazing flux, with longitudinal brazing flux traces embedded in the bulk of the filler metal, with a mass proportion of said brazing flux from 3 to 20%.

15. The brazing product according to claim 14, wherein the wire has a diameter from 1 to 3 mm.

16. The brazing product according to claim 14, wherein the mass proportion of said brazing flux is less than 15%.

17. The method according to claim 13, wherein the solid wire has a diameter of from 1 to 3 mm.

18. The method according to claim 13, wherein the compact billet has a diameter of at least 50 mm.

19. The method according to claim 13, wherein the second pressure is at least 15,000 bars.

20. A brazing product obtained by the method according to claim 1, characterized in that it comprises a compacted solid and rigid material, exclusively consisting of said brazing flux and of said filler metal, presenting the form of a block, its structure as observed in a transverse or longitudinal section of said product consisting of said coated filler metal particles having a size of 2 to 5 mm, said coated particles being compacted so that said brazing flux entirely fills the spaces between said metal particles, said solid material having mechanical strength making it extrudable under a press with a mass proportion of said brazing flux from 3 to 20%.

21. The brazing product according to claim 20, wherein the brazing product is in the form of a billet.

22. The brazing product according to claim 20, wherein the mass proportion of said brazing flux is less than 15%.

23. The method according to claim 1, wherein the filler metal particles are provided as an alloy.

24. The method according to claim 1, wherein the filler metal particles have a size of from 2 to 4 mm.

25. The method according to claim 1, wherein the brazing flux powder has a grain size of 10 to 40 μm.

26. The method according to claim 1, wherein the brazing flux paste is gradually poured on said metal particles.

27. The method according to claim 1, wherein the brazing flux paste is poured in a dropwise manner on said metal particles.

28. The method according to claim 1, wherein said metal particles are heated to a temperature of from 120 to 150° C.

29. The method according to claim 1, wherein said particles are compacted at a pressure of 7,000 bars.

* * * * *